United States Patent [19]

Ohga et al.

[11] Patent Number: 4,886,654

[45] Date of Patent: Dec. 12, 1989

[54] PROCESS FOR PRODUCING BARIUM TITANATES

[75] Inventors: Akihito Ohga; Akira Itani, both of Ichihara, Japan

[73] Assignee: Mitsui Petrochemical Industries, Ltd., Tokyo, Japan

[21] Appl. No.: 213,835

[22] Filed: Jun. 30, 1988

[30] Foreign Application Priority Data

Jul. 2, 1987 [JP] Japan ................ 62-163975

[51] Int. Cl.$^4$ ............................................. C01G 23/00
[52] U.S. Cl. .................................. 423/598; 423/608;
423/609; 423/610; 423/593; 423/592; 423/635;
423/636; 502/525; 501/137
[58] Field of Search ............... 423/598, 608, 609, 610,
423/593, 592, 635, 636; 502/525; 501/137

[56] References Cited

U.S. PATENT DOCUMENTS

| 3,637,531 | 1/1972 | Faxon et al. | 252/520 |
|---|---|---|---|
| 4,058,592 | 11/1977 | Quets | 423/598 |
| 4,065,544 | 12/1977 | Hamling et al. | 423/608 |
| 4,377,840 | 3/1983 | Nair | 423/598 |
| 4,392,180 | 7/1983 | Nair | 501/139 |
| 4,606,906 | 8/1986 | Ritter et al. | 423/598 |
| 4,627,966 | 12/1986 | Micheli | 423/598 |
| 4,640,905 | 2/1987 | Burn | 501/136 |
| 4,654,075 | 3/1987 | Cipollini | 423/592 |
| 4,670,243 | 6/1987 | Wilson et al. | 423/598 |
| 4,710,227 | 12/1987 | Harley et al. | 501/137 |
| 4,713,233 | 12/1987 | Marsh et al. | 423/608 |
| 4,764,493 | 8/1988 | Lilley et al. | 423/598 |

FOREIGN PATENT DOCUMENTS 2571713 4/1986 France .

OTHER PUBLICATIONS

Sakka et al, "Preparation of Glasses and Ceramics for Electrical Use Based on Alkoxide and Undirectional Solidification Methods", Japanese Journal of Applied Physics, 22(1983) Supplement 22-2, pp. 3-7.
Fukushima et al, "Preparation of BaTiO$_3$ Films by Hydrolysis of Organometallic Compounds", Ceramic Bulletin, 55(1976), pp. 1064 to 1065.
Journal of Materials Science, 20(1985), pp. 4479 to 4483.

Primary Examiner—Robert L. Stoll
Assistant Examiner—Paige C. Harvey
Attorney, Agent, or Firm—Sherman and Shalloway

[57] ABSTRACT

A process for producing barium titanates which comprises admixing a titanium alkoxide with a barium salt of a lower carboxylic acid in the presence of an organic solvent containing at least ethylene glycol monomethyl ether to provide a uniform mixture, bringing the mixture in contact with water to form a gelated product and drying and calcining the gelated product.

8 Claims, 4 Drawing Sheets

Angle of Diffraction

PROCESS FOR PRODUCING BARIUM TITANATES

FIELD OF THE INVENTION

The present invention relates to a process for producing barium titanates by a sol-gel process.

BACKGROUND OF THE INVENTION

Japanese Journal of Applied Physics, 22 (1983), Supplement, 22-2, pp. 3 to 7, discloses a process for producing barium titanates by a sol-gel process in which tetraisopropoxytitanium is admixed with barium metal in the presence of acetylacetone, acetic acid and isopropyl alcohol. This process poses, however, problems in that barium metal which is difficult to handle is used and that it is not easy to set optimum conditions because of a variety of organic solvents used.

Ceramic Bulletin, 55 (1976) pp 1064 to 1065, discloses a process for producing barium titanates by a sol-gel process in which a titanium alkoxide is admixed with barium naphthenate in butanol. However, this process involves problems in that the barium naphthenate because of its large molecular skeleton and molecular weight requires quantities of heat when calcined and that the barium titanates obtained by this process have a large percent shrinkage and are liable to be cracked.

Journal of Materials Science, 20 (1985) pp 4479 to 4483, discloses a process for producing lead titanates by a sol-gel process in which tetraisopropoxytitanium is admixed with lead acetate in ethylene glycol monomethyl ether and in which nitric acid is used as a catalyst for the hydrolysis. This article is, however, completely silent with respect to barium titanates. Further, because of the fact that while lead acetate is soluble in ethylene glycol monomethyl ether, barium acetate is insoluble in this solvent, a person skilled in the art would not conceive to apply the process of the article to the preparation of barium titanates.

OBJECT OF THE INVENTION

An object of the invention is to provide a process for producing barium titanates economically and at a high productivity in which use is made, as a raw material, of barium compounds which are inexpensive and easy to handle, and in which the calcination step can be carried out with reduced heat energy, and in which the product shows reduced percent shrinkage and reduced possibility of being cracked during the calcination step.

SUMMARY OF THE INVENTION

A process for producing barium titanates according to the invention comprises admixing a titanium alkoxide with a barium salt of a lower carboxylic acid in the presence of an organic solvent containing at least ethylene glycol monomethyl ether to provide a uniform mixture, reacting the mixture with water to provide a sol which is allowed to undergo gelation, or reacting the mixture with water to provide a gelated product, and drying and calcining the so formed gelated product.

In the process according to the invention use is made, as the starting barium compound, barium salts of lower carboxylic acids which are inexpensive and stable. While the barium salts of lower carboxylic acids are insoluble or hardly soluble in an organic solvent, we have found that they become soluble in the organic solvent, provided that there coexist ethylene glycol monomethyl ether and a titanium alkoxide, and thus it is possible to produce barium titanates by a sol-gel process using the barium salts of lower carboxylic acids as a starting material. We have also found that in the process according to the invention the calcination step can be carried out with reduced heat energy, thereby ensuring the product to exhibit reduced percent shrinkage during the calcination step.

DETAILED DESCRIPTION OF THE INVENTION

The process for producing barium titanates according to the invention will now be described in detail.

In the process according to the invention a barium salt of a lower carboxylic acid is used as a starting bairum compound. Examples of such barium salts include, for example, barium acetate, barium propionate and barium valerate. Of these, barium acetate is particularly preferred.

The barium salts of lower carboxylic acids as described above are insoluble or hardly soluble in an organic solvent such as an alcohol normally employed in the so-called sol-gel process, and thus there has been a prejudice that they would be unsuitable for use as a barium source in the sol-gel process for producing barium titanates. We have found, however, as stated above that while the barium salts of lower carboxylic acids themselves are insoluble or hardly soluble in an organic solvent, they become soluble in the organic solvent, provided that there coexist ethylene glycol monomethyl ether and a titanium alkoxide, and thus it is possible to produce barium titanates by the sol-gel process starting with the barium salts of lower carboxylic acids. The barium salts of lower carboxylic acids are inexpensive and stable enough to ensure easy handling. In addition, because of their small molecular skeleton and moleculat weight the calcination step requires reduced heat energy and the product ahows reduced percent shrinkage during the calcination.

Any titanium alkoxides that have heretofore been used in the known sol-gel process for producing barium titanates can be used herein. Examples of such titanium alkoxides include, for example, tetramethoxytitanium, tetraethoxytitanium, tetrapropoxytitanium and tetraisopropoxytitanium. Of these, tetraisopropoxytitanium is particularly preferred.

The barium salt and the titanium alkoxide are admixed together in an organic solvent containing at least ethylene glycol monomethyl ether. Since the barium salt is soluble in a mixture of the ethylene glycol monomethyl ether and the titanium alkoxide, the barium salt is uniformly admixed with the titanium alkoxide whereby it becomes possible to produce barium titanates by the so-called sol-gel process. The organic solvent may consist essentially of ethylene glycol monomethyl ether, or may be a mixture of ethylene glycol monomethyl ether and another organic solvent such as an alcohol. Examples of the alcohol include, for example, methanol, ethanol and isopropyl alcohol. In the latter case the organic solvent should preferably contain at leas 10% by volume of ethylene glycol monomethyl ether. Especially, when a thin film of barium titanate having a uniform thickness and free from crackings is to be prepared by intimately admixing a titanium alkoxide with a barium salt of a lower carboxylic acid in the presence of an organic solvent containing ethylene glycol monomethyl ether, bringing the mixture in contact with water to provide a sol, dipping a smooth substrate such as glass plate in the sol, taking out the substrate from the sol to form a thin sol film on the substrate, gelating the gel film, and drying and calcining the gel film, the solvent used should preferably contain from 10 to 40% by volume of ehtylene glycol monomethyl ether.

While the amounts of the titanium alkoxide and barium salt of a lower carboxylic acid admixed together depend upon the particular composition of the desired barium titanate, they are normally such that an atomic ratio of Ba to Ti (Ba/Ti) is not greater than 0.45, namely $0 < Ba/Ti \leq 0.45$.

The organic solvent containing ethylene glycol monomethyl ether is used preferably in an amount of from 2 to 30 times, more preferably from 3 to 10 times the combined weight of the titanium alkoxide and the barium salt.

After adding the titanium alkoxide and the barium salt to the organic solvent containing at least ethylene glycol monomethyl ether, the mixture is preferably heated to dissolve the barium salt in solution.

The uniform mixture so obtained is then brought in contact with water. This can be conveniently done by adding water to the mixture or by allowing the mixture to absorb moisture in air. It is believed that when the mixture is brought in contact with water, the titanium alkoxide in the mixture is hydrolyzed and reacts with the barium salt, whereby the mixture is transformed through the state of sol eventually to the state of gel. The hydrolysis may be carried out in the presence of a hydrolysis catalyst such as nitric acid or acetic acid, if desired.

The uniform mixture may be coated on a smooth substrate such as a glass plate and in that form it may brought in contact with water to form a thin film of gel. In this case if the gelation is caused to proceed under mild conditions such as by absorption of moisture in air, a thin film of barium titanate having uniform thickness and free from crackings can be eventually produced. Alternatively, a sol prepared by adding water to the above-mentioned uniform mixture may be coated on a substrate to form a sol film, which is then allowed to undergo gelation in air.

In a case wherein bulk or particulate barium titanate is to be eventually produced, excess amounts of water, for example, from 4 to 8 moles of water per mole of titanium is preferably added directly to the uniform mixture.

The gel is dried to remove the solvent, by-products formed during the gelation and residual water, and calcined to the desired barium titanate. The drying is preferably carried out at a temperature of from ambient temperature (about 25° C.) to about 200° C. ver a period of from several minutes to several hours in the case of thin film-like products and over a period of an hour to several days (e.g., a week) in the case of bulk or particulate products. The calcination is preferably carried out at a temperature of from about 800° to about 1300° C.

While the invention will be illustrated by the following examples, the invention is not resticted thereto. Reference is made to the attached drawings in which.

EXAMPLE 1

5.68 Grams of barium acetate and 28.43 grams of titanium isopropoxide, the atomic ratio Ba/Ti being 0.22, were weighed and added to 150 ml of ethylene glycol monomethyl ether as a solvent. The mixture was refluxed on an oil bath maintained at a temperature of 150° C. for a period of 2 hours to dissolve the barium acetate. At the end of the period, the solution was allowed to cool to ambient temperature (20° C.).

To the solution, a mixture of 3.6 ml of water and 50 ml of ethylene glycol monomethyl ether was added to ambient temperature.

The sol so obtained was allowed to stand for a period of about 10 hours whereupon gelation proceeded. The gel was dried to provide particulate gel of barium titanate.

The particulate gel was heat treated in an oxygen atmosphere at a temperature of 1300° C. to provide fine crystals of $Ba_2Ti_9O_{20}$ having good appearance. In this and following examples, the crylstalline phase of the product was identified by comparing an X-ray analysis chart of the product with ASTM cards, The X-ray analysis was carried out under conditions of 50 KW and 280 mA using CuKa as an irradiation source.

Figure 1:
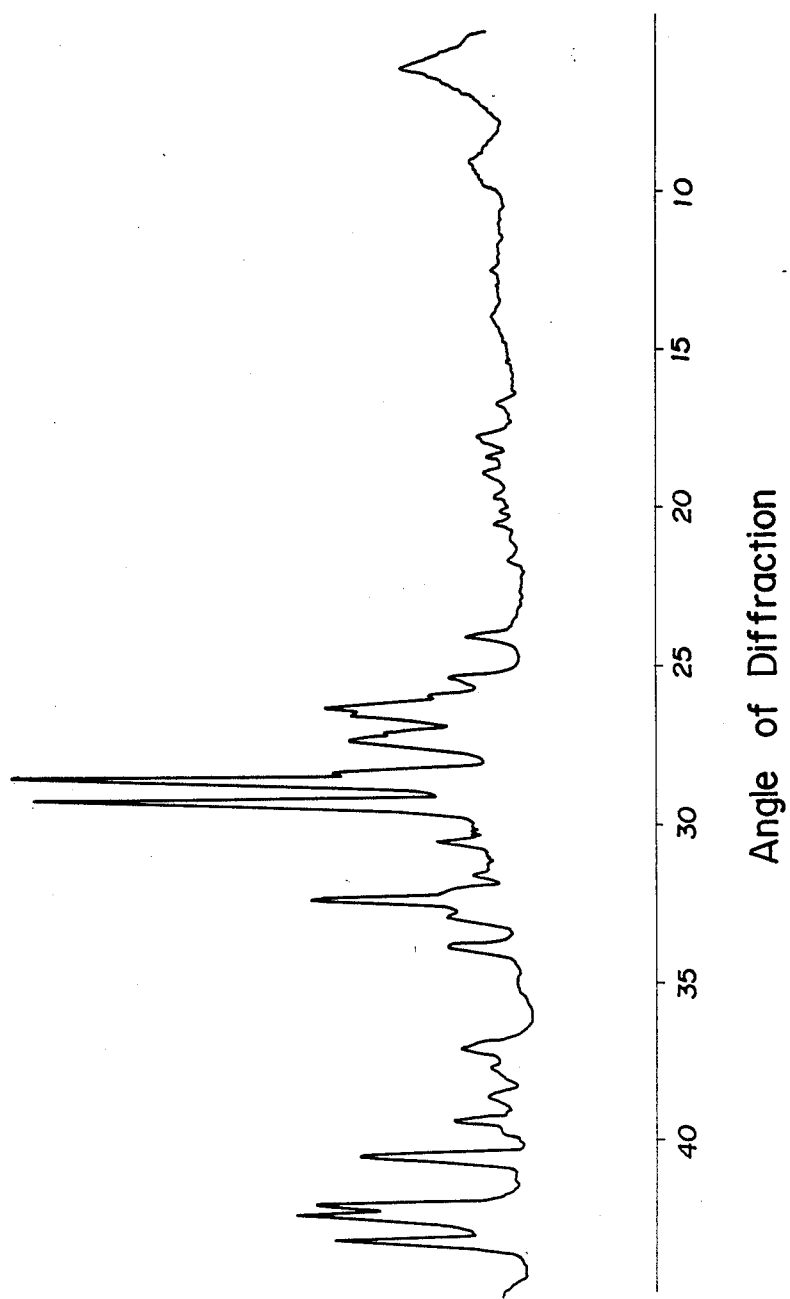
FIG. 1 is an X-ray chart of $Ba_2Ti_9O_{20}$ obtained in Example 1.

The X-ray chart of the $Ba_2Ti_9O_{20}$ so obtained is shown in FIG. 1.

EXAMPLE 2

Example 1 was repeated except that 6.39 Grams of barium acetate and 28.43 grams of titanium isopropoxide, the atomic ratio Ba/Ti being 0.25, were weighed and added to 150 ml of ethylene glycol monomethyl ether as a solvent.

Figure 2:
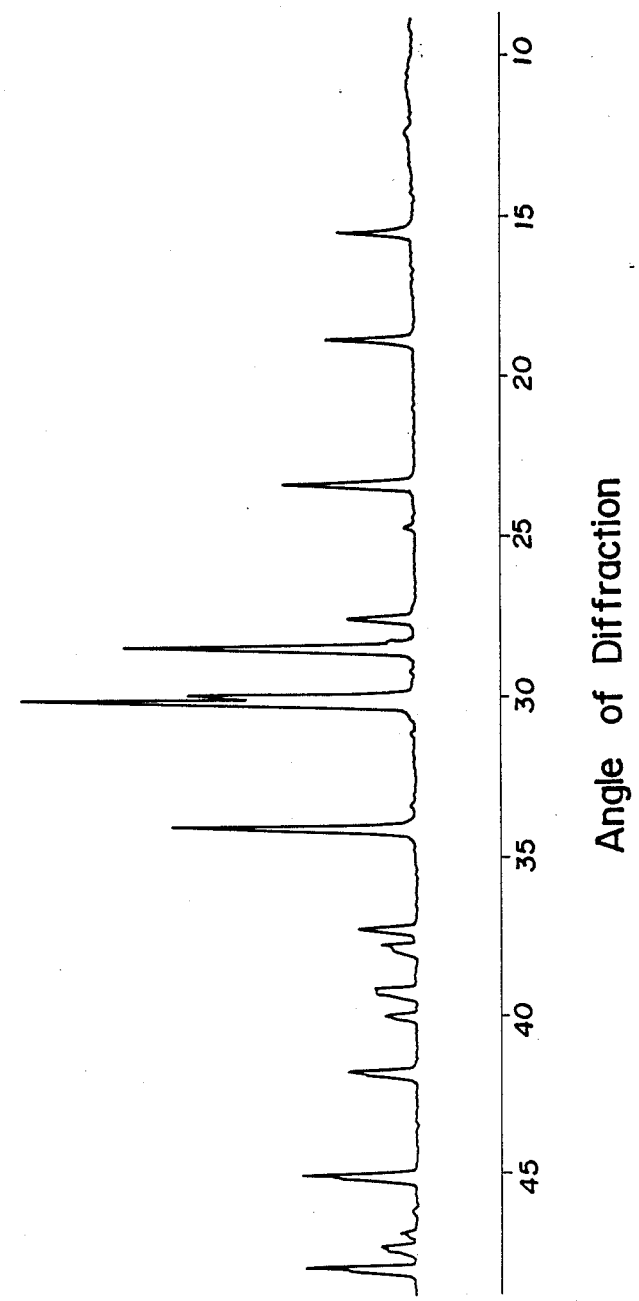
FIG. 2 is an X-ray chart of $BaTi_4O_9$ obtained in Example 2.

Fine crystals of $BaTi_4O_9$ of good appearance were obtained. The X-ray chart of the $BaTi_4O_9$ so obtained is shown in FIG. 2.

EXAMPLE 3

Example 1 was repeated except that 5.11 grams of barium acetate and 28.43 grams of titanium isopropoxide, the atomic ratio Ba/Ti being 0.20, were weighed and added to 150 ml of ethylene glycol monomethyl ether as a solvent and that the particulate gel was heat treated in air or oxygen at a temperature of 750° C.

Figure 3:
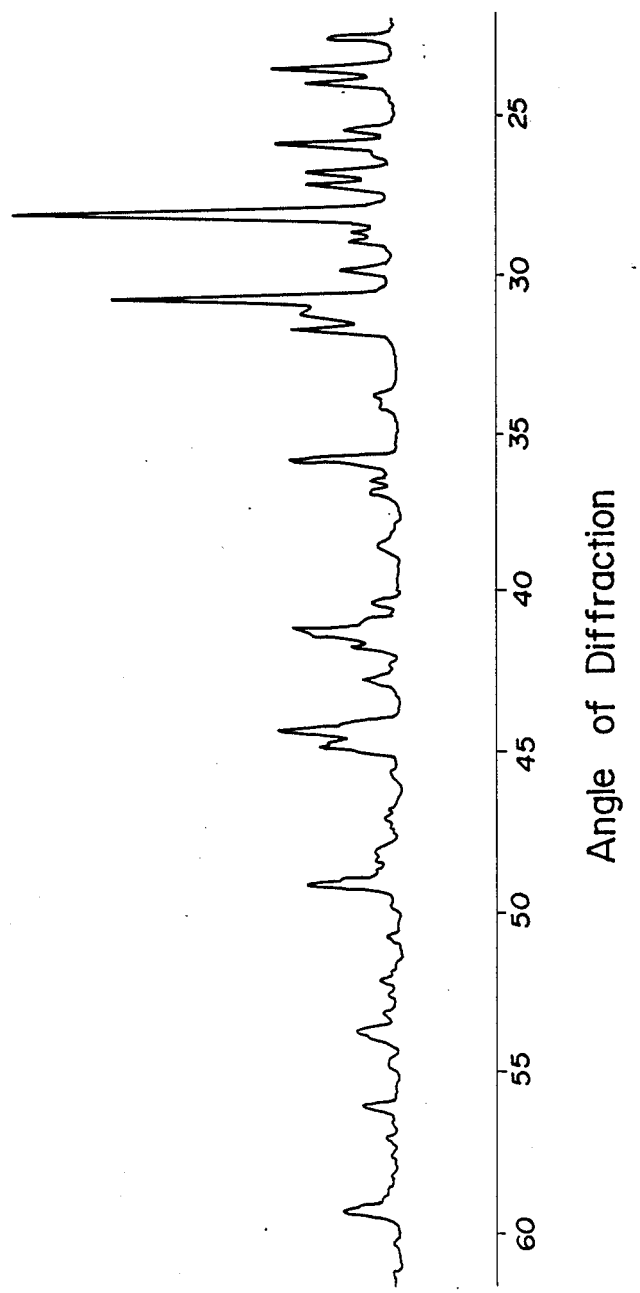
FIG. 3 is an X-ray chart of $BaTi_5O_{11}$ obtained in Example 3.

In each case, fine crystals of $BaTi_5O_{11}$ of good appearance were obtained. The X-ray chart of the $BaTi_5O_{11}$ so obtained is shown in FIG. 3.

EXAMPLE 4

A sol film was formed on a quartz substrate by dipping the substrate in a sol prepared in the manner as described in Example 1 and taking the substrate out of the sol. The sol film was dried in air and heat treated in air at a temperature of about 1000° C.

A crystalline film of barium titanate of good appearance free from crackings was obtained.

EXAMPLE 5

Example 1 was repeated except that 5.68 grams of barium acetate and 28.43 grams of titanium isopropoxide, the atomic ratio Ba/Ti being 0.22, were weighed and added to a solvent mixture of 30 ml of ethylene glycol monomethyl ether and 80 ml or ethanol, and that the particulate gel was heat treated in air or oxygen at a temperature of 1200° C.

Figure 4:
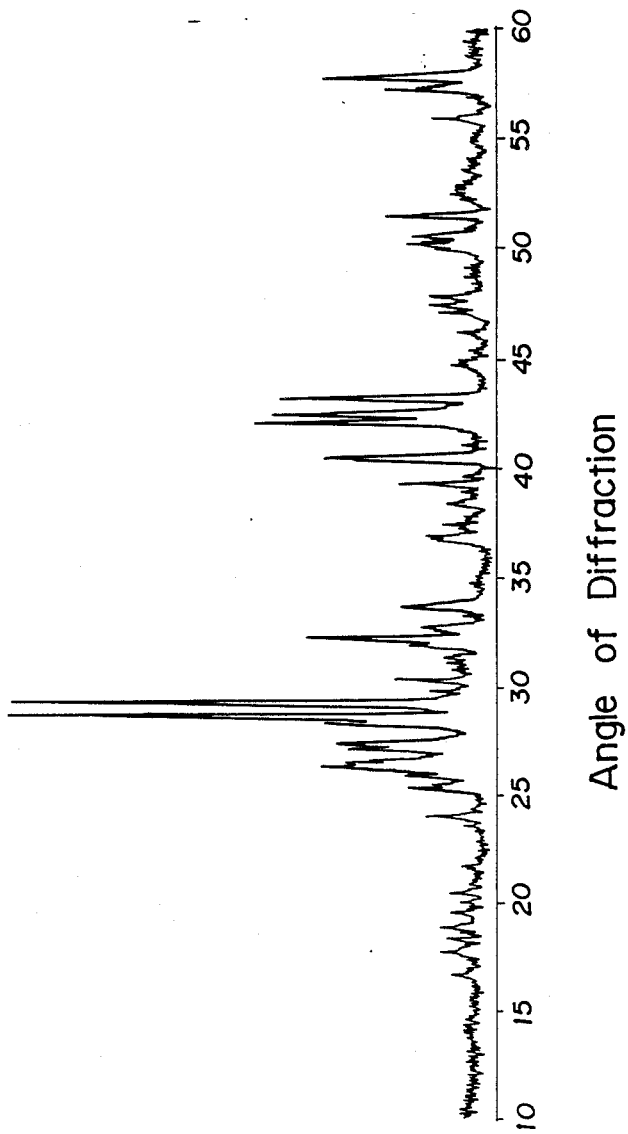
FIG. 4 is na X-ray chart of $Ba_2Ti_9O_{20}$ obtained in Example 5.

In each case fine crystals of $Ba_2Ti_9O_{20}$ having good appearance were obtained. The X-ray chart of the $Ba_2Ti_9O_{20}$ so obtained is shown in FIG. 4.

EXAMPLE 6

Example 1 was repeated except that 6.39 grams of barium acetate and 28.43 grams of titanium isopropoxide, the atomic ratio Ba/Ti being 0.25, were weighed and added to a solvent mixture of 30 ml of ethylene glycol monomethyl ether and 80 ml of ethanol, and that the particulate gel was heat treated in air or oxygen at a temperature of 1200° C., In each case fine crystals of $BaTi_4O_9$ having good appearance were obtained.

What is claimed is:

1. A process for producing barium titanates which comprises admixing a titanium alkoxide with a barium salt of a carboxylic acid having 5 carbon atoms or less in the presence of an organic solvent comprising ethylene glycol monomethyl ether to provide a solution, bringing said solution into contact with water to form a gelated product, and drying and calcining said gelated product.

2. The process according to claim 1 wherein said barium salt is barium acetate.

3. The process according to claim 1 wherein said barium salt is admixed with said titanium alkoxide in such proportions that an atomic ratio of Ba to Ti (Ba/Ti) is not greater than 0.45.

4. The process according to claim 1 wherein said organic solvent consists essentially of ethylene glycol monomethyl ether.

5. The process according to claim 1 wherein said organic solvent is a mixture of ethylene glycol monomethyl ether and ethanol.

6. The process according to claim 1 wherein said organic solvent is used in an amount of from 2 to 30 times the combined weight of said titanium alkoxide and said barium salt.

7. The process according to claim 1 wherein said drying is carried out at a temperature of from 25° to about 200° C.

8. The process according to claim 1 wherein said calcining is carried out at a temperature of from about 800° to about 1300° C.

* * * * *